United States Patent
Amiens

(10) Patent No.: US 6,978,157 B1
(45) Date of Patent: Dec. 20, 2005

(54) SYSTEM AND METHOD TO CONTROL A THIRD ITEM OF EQUIPMENT USING A SIM CARD, VIA A RADIO COMMUNICATION MODULE, CORRESPONDING RADIO COMMUNICATION MODULE AND THIRD ITEM OF EQUIPMENT

(75) Inventor: Christian Amiens, Bois-Colombes (FR)

(73) Assignee: Wavecom, Issy-les-Moulineaux Cedex (FR)

( * ) Notice: Subject to any disclaimer, the term of this patent is extended or adjusted under 35 U.S.C. 154(b) by 366 days.

(21) Appl. No.: 10/111,588

(22) PCT Filed: Oct. 13, 2000

(86) PCT No.: PCT/FR00/02878

§ 371 (c)(1),
(2), (4) Date: Jul. 30, 2002

(87) PCT Pub. No.: WO01/31953

PCT Pub. Date: May 3, 2001

(30) Foreign Application Priority Data

Oct. 26, 1999 (FR) .................................. 99 13645

(51) Int. Cl.$^7$ ............................. H04B 1/38; H04B 1/00
(52) U.S. Cl. .................... 455/558; 455/557; 455/73; 455/420; 455/550.1; 455/556.1
(58) Field of Search ............................. 455/558, 557, 455/550.1, 73, 418, 419, 420, 407, 556.1

(56) References Cited

U.S. PATENT DOCUMENTS 5,748,720 A * 5/1998 Loder ........................ 455/406
5,887,266 A 3/1999 Heinonen et al. ........... 455/558
6,097,967 A * 8/2000 Hubbe et al. ................ 455/558
6,456,857 B1 * 9/2002 Bos et al. ................. 455/550.1
6,504,932 B1 * 1/2003 Vasnier et al. .............. 380/273
6,557,753 B1 * 5/2003 Beaujard et al. ............. 235/375
6,658,246 B1 * 12/2003 Helaine ...................... 455/408
6,671,522 B1 * 12/2003 Beaudou ..................... 455/558
6,708,033 B1 * 3/2004 Linkola et al. ............. 455/440
6,714,798 B1 * 3/2004 De Kermadec ............. 455/558
6,775,725 B1 * 8/2004 Basquin et al. ............... 710/14
6,795,924 B1 * 9/2004 Kiessling et al. ........... 713/201
2001/0034246 A1 * 10/2001 Hutchison et al. .......... 455/557
2002/0013145 A1 * 1/2002 Matsumura ................. 455/418

FOREIGN PATENT DOCUMENTS

DE  198 16 575 A1  11/1997
EP  0 869 691 A2  10/1998

* cited by examiner

OTHER PUBLICATIONS

"Digital cellular telecommunications system (Phase 2+); AT command set for GSM Mobile Equipment (ME) (GSM 07.07 version 5.1.0)" *European Telecommnication Standard XP002083871*, pp. 1-79, Nov. 1996.

Primary Examiner—Sonny Trinh
Assistant Examiner—Huy Phan
(74) Attorney, Agent, or Firm—Westman, Champlin & Kelly

(57) ABSTRACT

The invention relates to a radiocommunication module (2), of the type cooperating with a SIM card (1) in the form of at least one first SIM Application Toolkit dialogue. According to the invention, said module also cooperates with third item of equipment (3) and comprises means (21) to convert said at least one first dialogue, between said SIM card and said module, into at least one second dialogue, between said module and said third item of equipment, such that said SIM card controls said third item of equipment via said module.

22 Claims, 1 Drawing Sheet

SYSTEM AND METHOD TO CONTROL A THIRD ITEM OF EQUIPMENT USING A SIM CARD, VIA A RADIO COMMUNICATION MODULE, CORRESPONDING RADIO COMMUNICATION MODULE AND THIRD ITEM OF EQUIPMENT

CROSS-REFERENCE TO RELATED APPLICATIONS

This application is a Section 371 application of International Application No. PCT/FR00/02878 filed Oct. 13, 2000 and published as WO 01/31953 on May 3, 2001, not in English.

FIELD OF THE INVENTION

The field of the invention is that of radiocommunication systems according to the GSM 900 (Global System for Mobile communications 900 MHz) standard, or an equivalent standard, such as the DCS 1800 (Digital Cellular System 1800 MHz) standard in particular.

BACKGROUND OF THE INVENTION

More precisely, the invention relates to a system and method to control third item of equipment using a SIM card, via a radiocommunication module. The invention also relates to the corresponding radiocommunication module and third item of equipment.

Conventionally, a radiocommunication system subscriber has a mobile station (sometimes also referred to as a mobile telephone) comprising:
- a terminal (or ME, for "Mobile Equipment"), itself comprising a radiocommunication module (or "GSM module") providing a wireless communication function and controlling various hardware components (screen, keyboard, speaker, etc.);
- cooperating with a SIM (Subscriber Identity Module) card.

Optionally, a set of commands and procedures referred to as the "SIM Application Toolkit" is provided. It operates as follows: the SIM card sends an SAT (SIM Application Toolkit) command to the terminal, which executes it and then reports to the SIM card on the correct or incorrect execution of the SAT command. For more information, refer to the ETSI standard "GSM 11.14 (Phase 2+), inserted as a reference.

In sum, the SIM Application Toolkit enables the SIM card to control and send commands to the terminal, so as to control certain hardware components (screen, keyboard, speaker, etc.) of the terminal man/machine interface. In this way, the SIM card can particularly control the display on the screen of a menu or a given text, data input on the keyboard by the user, transmission of a short message, playing a tone by the speaker, setting up a call, provision of location information, etc. Therefore, the SIM Application Toolkit can be used to introduce new functions, which opens up a wide range of added value services. Indeed, service providers can develop new applications for subscribers and load them into the SIM cards, without modifying the radiocommunication terminals.

It is important to note that the SIM Application Toolkit functions were only originally devised, and are only currently offered, for a SIM card cooperating with a radiocommunication terminal. There is no provision for the case where the terminal also cooperates with third item of equipment and only serves as a modem.

In addition, other applications have already been envisaged for the above-mentioned radiocommunication module.

It has particularly been proposed to integrate the radiocommunication module into devices other than radiocommunication terminals, but nonetheless requiring a wireless communication function. For example, telemetry (meter readings) devices or credit card reader devices may be mentioned.

It has also been proposed to supply the radiocommunication module in an independent form: it is then considered as a modem. Such a modem does not comprise any man/machine interface hardware components (screen, keyboard, speaker, etc.). It is intended to cooperate with an item of third item of equipment (supporting a client application), which comprises man/machine interface hardware components. The third item of equipment may in particular, but not exclusively, be a PC. As a general rule, it controls the module, generally using a set of AT (ATtention) commands. These commands are originally intended to enable third item of equipment (or TE Terminal Equipment) to request a radiocommunication terminal to which it is connected to execute certain predetermined actions. For more details on these AT commands, refer to the ETSI standard "GSM 07.07" and the ITU-IT recommendation V25ter, inserted as references.

A radiocommunication terminal, or another device as mentioned above, may also be used, exceptionally, as a modem for third item of equipment with which it cooperates. From an operational viewpoint, this consists of the same situation as that discussed above for an actual modem (i.e. when the radiocommunication module is supplied independently).

Unfortunately, the radiocommunication module, irrespective of the envisaged application (terminal, other device, or modem), does not appear to allow the use of the SIM Application Toolkit if said module cooperates with third item of equipment and only behaves as a modem. Indeed, in this case, the man/machine interface hardware components of the third item of equipment are used. The module does not control said man/machine interface hardware components directly and therefore cannot execute the SAT commands sent by the SIM card.

In other words, the state of the art involves the major drawback of not enabling a SIM card to use the SIM Application Toolkit to control third item of equipment, via a radiocommunication module.

The invention particularly aims to make up for this major drawback of the state of the art.

More precisely, one of the aims of the present invention is to provide a system and method to control third item of equipment using a SIM card implementing the SIM Application Toolkit, via a radiocommunication module. In other words, the aim is to open the SIM Application Toolkit functions, originally devised for radiocommunication terminals, to third item of equipment.

The invention also aims to provide such a system and method, which require no modification in the SIM card.

Another aim of the invention is to provide such a system and method, which are adapted to the different types of SIM Application Toolkit dialogue (or dialogue elements) that already exist, or will exist in the future (if new SAT commands are added to current set of SAT commands).

SUMMARY OF THE INVENTION

These different aims, and others which will be seen more clearly below, are achieved according to the invention using a radiocommunication module, of the type cooperating with a SIM card in the form of at least one first SIM Application Toolkit dialogue, said module also cooperating with third item of equipment, and said module comprising means to convert said at least one first dialogue, between said SIM card and said module, into at least one second dialogue, between said module and said third item of equipment, such that said SIM card controls said third item of equipment via said module.

Therefore, the general principle of the invention consists of performing a dialogue conversion in the radiocommunication module. In this way, a first dialogue, on a first interface between the SIM card and the module, is transferred to a second dialogue, on a second interface between the module and the third item of equipment. In this way, it is the third item of equipment, by means of the hardware components of its man/machine interface, which finally executes the SAT commands sent by the SIM card to the module. Therefore, the present invention makes it possible for third item of equipment manufacturers to have access to the SIM Application Toolkit applications embedded in the SIM card.

Advantageously, said radiocommunication module is comprised in a device belonging to the group comprising:
radiocommunication terminals;
devices other than radiocommunication terminals requiring a wireless communication function;
modems.

In the first two cases (terminal or other device), the present invention is only of interest if the radiocommunication module serves as a modem for the third item of equipment and therefore does not control the man/machine interface hardware components directly.

Advantageously, said module cooperates with said third item of equipment on a physical medium belonging to the group comprising: serial links, infrared links, radio links, etc. It is clear that this list is not exhaustive. An example of a radio link is an HF link according to the "Bluetooth" standard.

Preferentially, said at least one first SIM Application Toolkit type dialogue is constructed with at least part of a set of SAT commands written according to a first encoding, and said at least one second dialogue is constructed with at least part of a set of commands and/or unsolicited results written according to a second encoding separate from said first encoding.

Note that that an unsolicited result is a spontaneous message, which is not a response to a previous command and does not imply a response.

Preferentially, said second encoding belongs to the group comprising: AT type encoding and level 2 encapsulation type encoding. It is clear that other types of encoding may be envisaged, while remaining within the scope of the present invention.

In a preferential embodiment of the invention, said set of commands and/or unsolicited results comprises:
a configuration command STSF, via which the third item of equipment informs the module of the SIM Application Toolkit type functions supported by said third item of equipment;
an SAT command indication STIN, via which the module indicates to the third item of equipment which of said SAT commands it has received from the SIM card;
an information retrieval command STGI, via which the third item of equipment requests the module to give it a module response containing information relating to one of said SAT commands mentioned in an SAT command indication previously received by the third item of equipment;
a response control indication STCR, via which the module requests the third item of equipment to give it a user response relating to a connection that the module wishes to set up, said user response being intended to be provided to the SIM card by the module, such that the SIM card performs a prior check of said connection;
a user response provision command STGR, via which the third item of equipment gives a user response to the module, after said third item of equipment has successively received an SAT command indication followed by a module response to a corresponding information retrieval command.

In this way, the dialogue conversion is implemented with only a restricted set of three commands, sent by the third item of equipment, and two indications, sent by the module. The generic nature of said commands and indications makes it possible to convert any first dialogue (between the SIM card and the module). This also applies for future dialogue elements using new SAT commands (not known to date).

The invention also relates to third item of equipment, of the type cooperating with a radiocommunication module as described above, said third item of equipment comprising means to implement said at least one second dialogue, between said module and said third item of equipment, such that said SIM card controls said third item of equipment via said module.

The invention also relates to a system to control third item of equipment using a SIM card, via a radiocommunication module, said radiocommunication module being of the type cooperating with said SIM card in the form of at least one first SIM Application Toolkit type dialogue, said module comprising means to convert said at least one first dialogue, between said SIM card and said module, into at least one second dialogue, between said module and said third item of equipment, and said third item of equipment comprising means to implement said at least one second dialogue, between said module and said third item of equipment, such that said SIM card controls said third item of equipment via said module.

Finally, the invention also relates to a method to control third item of equipment using a SIM card, via a radiocommunication module, said radiocommunication module being of the type cooperating with said SIM card in the form of at least one first SIM Application Toolkit type dialogue, said method comprising a conversion step, by said module, of said at least one first dialogue, between said SIM card and said module, into at least one second dialogue, between said module and said third item of equipment, such that said SIM card controls said third item of equipment via said module.

BRIEF DESCRIPTION OF THE DRAWINGS

The invention's other characteristics and advantages will emerge upon reading the following description of a preferential embodiment of the invention, given as an indicative and non-restrictive example, and the appended figures, wherein.

DETAILED DESCRIPTION OF PREFERRED EMBODIMENTS

Figure 1:
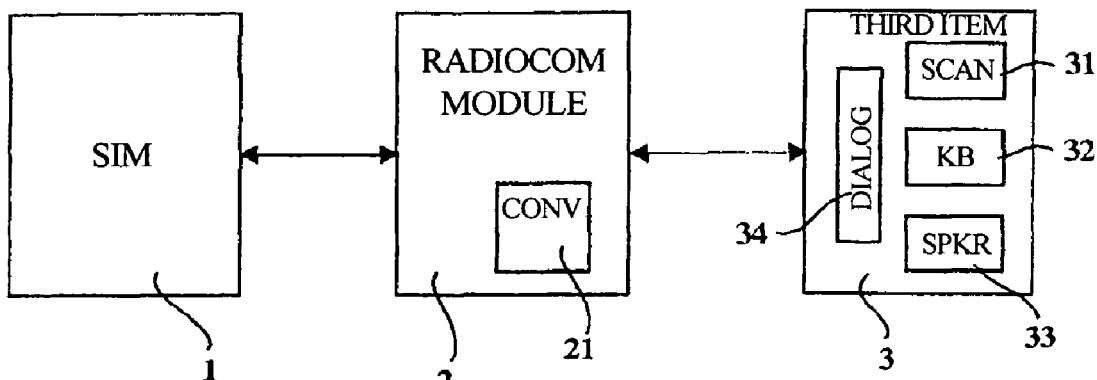
FIG. 1 shows a simplified diagram of a system according to the present invention to control third item of equipment using a SIM card, via a radiocommunication module; and each of FIGS. 2 to 4 shows an example of dialogue elements between the radiocommunication module and the third item of equipment.

Therefore, as illustrated in the diagram in FIG. 1, the present invention relates to a system to control third item of equipment 3 using a SIM card 1, via a radiocommunication module 2.

It is assumed that the SIM card 1 is of the type able to implement the SIM Application Toolkit. This means that the SIM card 1 cooperates with the radiocommunication module 2 in the form of first dialogues, by sending SAT commands. Note that the SIM Application Toolkit, which is based on a set of approximately 25 SAT commands distributed into three classes, comprises five types of first dialogues, originally between a SIM card and a radiocommunication terminal:

- the profile download, enabling the terminal to indicate to the SIM card which SIM Application Toolkit functions it can implement (i.e. which SAT commands it can execute);
- the Proactive SIM mechanism, enabling the SIM card to request the terminal to execute certain actions, such as in particular: menu display, display of a given text, retrieval of user input, short message transmission, playing a requested tone, setting up a call, provision of location information, etc;
- data download into the SIM card, making it possible to transfer, directly to the SIM card, data (SMS, directory, etc.) or programs (Java applets) received by the terminal via SMS or cellular radiocommunication;
- menu selection, making it possible to inform the SIM card of a selection made, by the user of the terminal, in a set of menu items previously supplied to the terminal;
- call checking by the SIM card, enabling the SIM card to check all the numbers dialled, all the supplementary service checking strings and all the USSD (Unstructured Supplementary Service Data) strings, before connection to the network.

At this point, it is important to note that one of these types of first dialogue, i.e. data download in the SIM card, requires no dialogue conversion. Indeed, it is transparent for the terminal.

It is also assumed that the radiocommunication module 2 is not capable of executing these SAT commands alone, due to the fact that it does not control any man/machine interface means with a user directly. Note that:

- if the module is comprised in a modem, this assumption is always checked;
- if the module is comprised in a radiocommunication terminal (or another device, as described above), this assumption is only checked when the terminal (or the other device) behaves like a modem.

Finally, it is assumed that the third item of equipment 3 runs a client application and comprises man/machine interface means with a user, such as, in particular, a screen 31, a keyboard 32 and a speaker 33. It consists of a PC for example.

According to the invention, transparently for the SIM card which only "sees" the radiocommunication module, the radiocommunication module 2 comprises means 21 to convert each first dialogue, between the SIM card 1 and the module 2, into a second dialogue, between the module 2 and the third item of equipment 3. The third item of equipment 3 in turn comprises means 34 (for example a processor) to implement each second dialogue, between the module 2 and the third item of equipment 3.

Each second dialogue, between the module 2 and the third item of equipment 3, consists for example of an exchange of commands and indications in AT format on a serial link.

Figure 2:
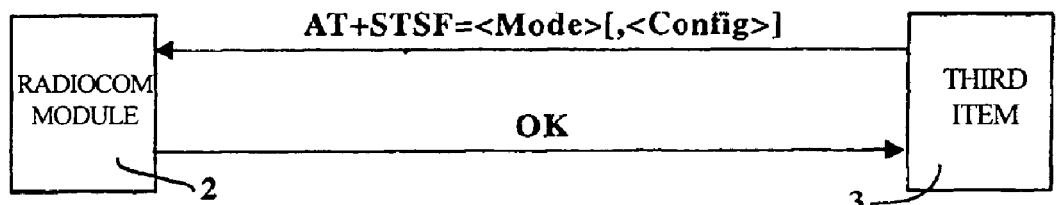
Figure 3:
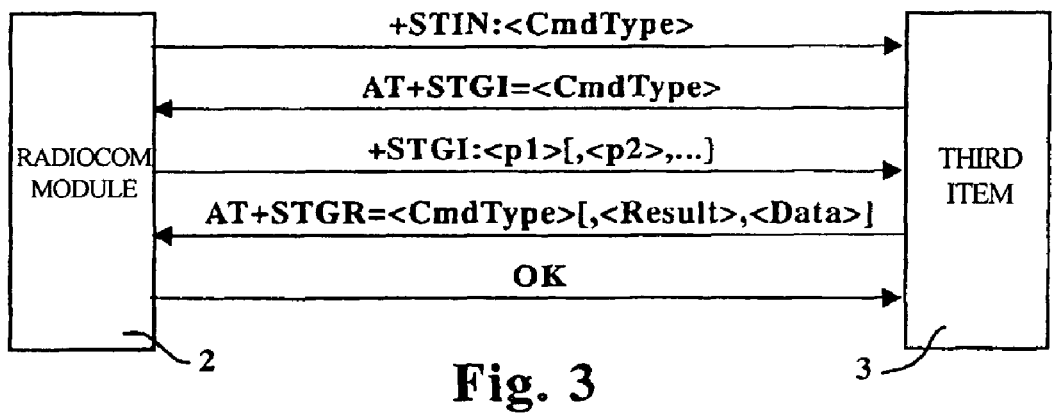
Figure 4:
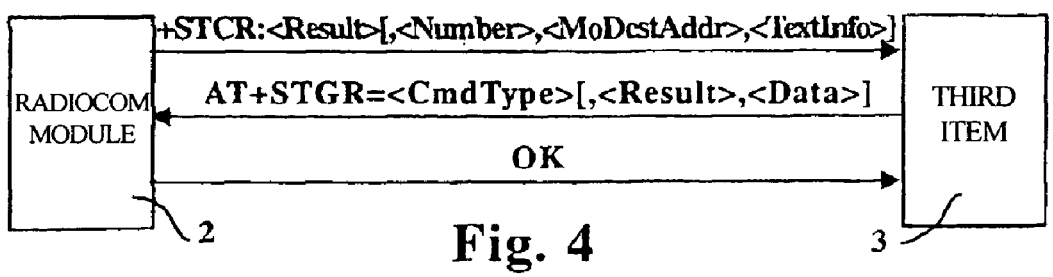

Now, with reference to FIGS. 2 to 4, we shall present a specific embodiment of a restricted set of commands (sent by the third item of equipment 3 to the module 2) and generic indications (sent by the module 2 to the third item of equipment 3) comprising:

- a configuration command "AT+STSF" (SIM Toolkit Set Facilities);
- an SAT command indication "+STIN" (SIM Toolkit INdication);
- an information retrieval command "AT+STGI" (SIM Toolkit Get Information);
- a response control indication "+STCR" (SIM Toolkit Control Response);
- a user response provision command "AT+STGR" (SIM Toolkit Give Response).

As explained below, this restricted set of commands and generic indications, in AT format, can be used to describe all types of second dialogue. It completes the existing set of AT commands and indications.

A) The configuration command, "AT+STSF" It comprises the following three syntaxes:

| "AT+STSF" command syntax | Possible responses |
| --- | --- |
| AT+STSF=<Mode> [,<Config>] | * OK<br>* +CME ERROR: <err> |
| AT+STSF? | * +STSF: <Mode>, <Config> |
| AT+STSF=? | *+STSF: (0–2), (160060C0–5F9FFF7)<br>* OK |

The <Mode> parameter may for example take the values 0, 1 and 2, to respectively deactivate, activate or configure the SIM Application Toolkit functions. The activation or deactivation of the SIM Application Toolkit functions requires the use of a +CFUN command ("Set phone functionality") to reset the module. The <Config> parameter contains the list of SIM Application Toolkit functions supported by the third item of equipment.

The first syntax (AT+STSF=<Mode>[, <Config>]) enables the third item of equipment to inform the module of the SIM Application Toolkit functions supported by the third item of equipment. This is carried out by the activation, deactivation or configuration of the SIM Application Toolkit functions. In response, the module sends OK if there were no errors, or an error message set according to the type of error (+CME ERROR: <err>) otherwise.

The second and third syntaxes are more intended for the person in charge of development and/or maintenance of the client application supported by the third item of equipment. The second syntax (AT+STSF?) enables the third item of equipment to retrieve the current module configuration. The third syntax (AT+STSF=?) enables the third item of equipment to retrieve either the possible value ranges of the different parameters (STSF: (0–2), (160060C0-5F9FFF7)), or simply "OK".

B) SAT Command Indication, "+STIN"

It comprises the following syntax: +STIN: <CmdType>

It enables the module to indicate to the third item of equipment that it has received from the SIM card one of the SAT commands, specified by the <CmdType> parameter. For example, the <CmdType> parameter takes the value 1 to indicate that the SIM card has sent the command "Display text" to the module, 2 for the "Get Inkey" command, 3 for the "Get Input" command, 4 for the "Setup Call" command, 5 for the "Play Tone" command, 6 for the "Sel Item" command, 7 for the "Refresh" command, 8 for the "Send SS" command, 9 for the "Send SMS" command, 98 to indicate the idle time when there is no response from the user, and 99 for the "End Session" command.

C) Information Retrieval Command, "AT+STGI"

It comprises the following two syntaxes:

| "AT+STGI" command syntax | Possible responses |
|---|---|
| AT+STGI=<CmdType> | * +STGI: <p1>, <p2>, . . . |
|  | * +CME ERROR: <err> |
| AT+STGI? | * +STGI: (0–9) |
|  | * OK |

The <CmdType> parameter may for example take the values 0 to 9, as explained above for the SAT command indication ("+STIN"). In the different possible responses, the parameters <p1>, <p2>, . . . depend on the value of the <CmdType> parameter. For example, if <CmdType>=4 (the SIM card sent the "Setup Call" command to the module), then the response comprises the following parameters: <Type>, <CalledNb>, <SubAddress>, <Class>, respectively defining the type, the called number, sub-address and class for the call to be set up.

The first syntax (AT++STGI=<CmdType>) enables the third item of equipment to request the module to give its module response containing information relating to the SAT command mentioned in a SAT command indication ("+STIN") previously received by the third item of equipment. The module sends either the expected module response (+STGI: <p1>, <p2>, . . . ), or an error message set according to the error type (+CME ERROR: <err>).

The second syntax (AT+STGI=?) is more intended for the person in charge of development and/or maintenance of the client application supported by the third item of equipment. It enables the third item of equipment to retrieve either the possible value ranges of the different parameters (+9STGI: (0–9)), or simply "OK".

D) Response Control Indication, "+STCR"

It comprises the following syntax:

+STCR: <Result>[, <Number>, <MODestAddr>, <TextInfo>]

It enables the module to request the third item of equipment to give it a user response (+STGR, see below) relating to a connection that the module wants to set up, said user response being intended to be provided to the SIM card by the module, such that the SIM card performs a prior check on the connection.

For example, the <Result> parameter takes the value 0 to indicate that response control is not authorised, and 1 for a response control with modifications. The <Number> parameter may be a called number, a service centre address or an "SS" string in ASCII format. The <MODestAddr> parameter is an "MO" destination address in ASCCI format. The <TextInfo> parameter is an information text in ASCII format.

E) User Response Provision Command, "AT+STGR"

It comprises the following two syntaxes:

| "AT+STGR" command syntax | Possible responses |
|---|---|
| AT+STGR=<CmdType> [,<Results>, <Data>] | * OK |
|  | * +CME ERROR: <err> |
| AT+STGR=? | * OK |

The possible values and the significance of the <Result> and <Data> parameters when they exist depend on the value and significance of the <CmdType> parameter. For example, the <CmdType> parameter takes the value 4 to indicate that it is a user response to the "Setup Call" command. In this case, only the <Result> parameter is defined, and takes the value 0 or 1 depending whether the user accepts or rejects the call.

The first syntax (AT+STGR=<CmdType>[, <Result>, <Data>]) enables the third item of equipment to give, in command form, a user response ("AT+STGR") to the module, after the third item of equipment has successively received an SAT command indication ("+STIN") followed by a module response ("+STGI") to a corresponding information retrieval command ("AT+STGI"). In response, the module sends OK if there were no errors, or an error message set according to the type of error (+CME ERROR: <err>) otherwise.

The different user responses possible enable the third item of equipment to respond to the following proactive commands: "GET_INKEY" (key pressed by the user), "GET_INPUT" (message input by the user), "SELECT_ITEM" (item selected), "SETUP_CALL" (user confirmation), "DISP_TEXT" (user confirmation to delete the message) and "END SESSION" (user abort).

The second syntax (AT+STGR=?) is more intended for the person in charge of development and/or maintenance of the client application supported by the third item of equipment. It enables the third item of equipment to retrieve simply "OK".

As illustrated in FIG. 2, a second dialogue using the configuration command ("AT+STSF") corresponds to a first "Profile Download" type dialogue.

As illustrated in FIG. 3, a second dialogue using the SAT command indication ("+STIN"), the information retrieval command ("AT+STGI") and the user response provision command ("AT+STGR") corresponds to a first "Proactive SIM" or "Profile Download" or "menu selection" type dialogue.

As illustrated in FIG. 4, a second dialogue using the response control indication ("+STCR") and the user response provision command ("AT+STGR") corresponds to a first "SIM card call control" type dialogue.

It is clear that numerous other embodiments of the invention may be envisaged. It is particularly possible to provide for other types of physical media between the module 2 and the third item of equipment 3, such as an infrared link or a radio link in particular.

Similarly, other types of encoding of commands and/or indications forming the second dialogues (between the module and the third item of equipment) may be envisaged, such as encoding in particular according to level 2 encapsulation protocols.

What is claimed is:

1. Radiocommunication module of the type cooperating with a SIM card in the form of at least one first SIM Application Toolkit dialogue, characterised in that said radiocommunication module also cooperates with an equipment, called a third item of equipment due to the third item of equipment being separated from a first item of equipment which is said SIM card and from a second item of equipment which is said module, and in that said radiocommunication module comprises means to convert said at least one first dialogue, between said SIM card and said module, into at least one second dialogue, between said module and said third item of equipment, such that said SIM card controls said third item of equipment via said module.

2. Module according to claim 1, characterised in that said radiocommunication module is comprised in a device belonging to the group comprising:
   radiocommunication terminals;
   devices other than radiocommunication terminals requiring a wireless communication function; and
   modems.

3. Module according to claim 2, characterised in that said module cooperates with said third item of equipment on a physical medium belonging to the group comprising:
   serial links;
   infrared links; and
   radio links.

4. Module according to claim 3, characterised in that said at least one first SIM Application Toolkit type dialogue is constructed with at least part of a set of SAT commands written according to a first encoding, and in that said at least one second dialogue is constructed with at least part of a set of commands and/or unsolicited results written according to a second encoding separate from said first encoding.

5. Module according to claim 2, characterised in that said at least one first SIM Application Toolkit type dialogue is constructed with at least part of a set of SAT commands written according to a first encoding, and in that said at least one second dialogue is constructed with at least part of a set of commands and/or unsolicited results written according to a second encoding separate from said first encoding.

6. Third item of equipment of the type cooperating with a radiocommunication module according to claim 5, characterised in that it comprises means to implement said at least one second dialogue, between said module and said third item of equipment, such that said SIM card controls said third item of equipment via said module.

7. Third item of equipment of the type cooperating with a radiocommunication module according to claim 2, characterised in that it comprises means to implement said at least one second dialogue, between said module and said third item of equipment, such that said SIM card controls said third item of equipment via said module.

8. Module according to claim 1, characterised in that said module cooperates with said third item of equipment on a physical medium belonging to the group comprising:
   serial links;
   infrared links; and
   radio links.

9. Third item of equipment of the type cooperating with a radiocommunication module according to claim 8, characterised in that it comprises means to implement said at least one second dialogue, between said module and said third item of equipment, such that said SIM card controls said third item of equipment via said module.

10. Module according to claim 1, characterised in that said at least one first SIM Application Toolkit type dialogue is constructed with at least part of a set of SAT commands written according to a first encoding, and in that said at least one second dialogue is constructed with at least part of a set of commands and/or unsolicited results written according to a second encoding separate from said first encoding.

11. Module according to claim 10, characterised in that said second encoding belongs to the group comprising:
   AT type encoding;
   level 2 encapsulation type encoding.

12. Module according to claim 11, characterised in that said set of commands and/or unsolicited results comprises:
   a configuration command (STSF), via which the third item of equipment informs the module of the SIM Application Toolkit type functions supported by said third item of equipment;
   an SAT command indication (STIN), via which the module indicates to the third item of equipment which of said SAT commands it has received from the SIM card;
   an information retrieval command (STGI), via which the third item of equipment requests the module to give it a module response containing information relating to one of said SAT commands mentioned in an SAT command indication previously received by the third item of equipment;
   a response control indication (STCR), via which the module requests the third item of equipment to give it a user response relating to a connection that the module wishes to set up, said user response being intended to be provided to the SIM card by the module, such that the SIM card performs a prior check of said connection; and
   a user response provision command (STGR), via which the third item of equipment gives a user response to the module, after said third item of equipment has successively received an SAT command indication followed by a module response to a corresponding information retrieval command.

13. Third item of equipment of the type cooperating with a radiocommunication module according to claim 12, characterised in that it comprises means to implement said at least one second dialogue, between said module and said third item of equipment, such that said SIM card controls said third item of equipment via said module.

14. Third item of equipment of the type cooperating with a radiocommunication module according to claim 11, characterised in that it comprises means to implement said at least one second dialogue, between said module and said third item of equipment, such that said SIM card controls said third item of equipment via said module.

15. Module according to claim 10, characterised in that said set of commands and/or unsolicited results comprises:
   a configuration command (STSF), via which the third item of equipment informs the module of the SIM Application Toolkit type functions supported by said third item of equipment;
   an SAT command indication (STIN), via which the module indicates to the third item of equipment which of said SAT commands it has received from the SIM card;
   an information retrieval command (STGI), via which the third item of equipment requests the module to give it a module response containing information relating to one of said SAT commands mentioned in an SAT command indication previously received by the third item of equipment;
   a response control indication (STCR), via which the module requests the third item of equipment to give it a user response relating to a connection that the module wishes to set up, said user response being intended to be provided to the SIM card by the module, such that the SIM card performs a prior check of said connection; and a user response provision command (STGR), via which the third item of equipment gives a user response to the module, after said third item of equipment has successively received an SAT command indication followed by a module response to a corresponding information retrieval command.

16. Third item of equipment of the type cooperating with a radiocommunication module according to claim 15, characterised in that it comprises means to implement said at least one second dialogue, between said module and said third item of equipment, such that said SIM card controls said third item of equipment via said module.

17. Third item of equipment of the type cooperating with a radiocommunication module according to claim 10, characterised in that it comprises means to implement said at least one second dialogue, between said module and said third item of equipment, such that said SIM card controls said third item of equipment via said module.

18. Third item of equipment of the type cooperating with a radiocommunication module according to claim 1, characterised in that it comprises means to implement said at least one second dialogue, between said module and said third item of equipment, such that said SIM card controls said third item of equipment via said module.

19. System to control a third item of equipment, which is separated from a first item of equipment and from a second item of equipment, using a SIM card which is the first item of equipment, via a radiocommunication module which is the second item of equipment, said radiocommunication module being of the type cooperating with said SIM card in the form of at least one first SIM Application Toolkit type dialogue, characterised in that said module comprises means to convert said at least one first dialogue, between said SIM card and said module, into at least one second dialogue, between said module and said third item of equipment, and in that said third item of equipment comprises means to implement said at least one second dialogue, between said module and said third item of equipment, such that said SIM card controls said third item of equipment via said module.

20. Method to control a third item of equipment, which is separated from a first item of equipment and from a second item of equipment, using a SIM card which is the first item of equipment, via a radiocommunication module which is the second item of equipment, said radiocommunication module being of the type cooperating with said SIM card in the form of at least one first SIM Application Toolkit type dialogue, characterised in that said method comprises a conversion step, by said module, of said at least one first dialogue, between said SIM card and said module, into at least one second dialogue, between said module and said third item of equipment, such that said SIM card controls said third item of equipment via said module.

21. Radiocommunication module of the type cooperating with a SIM card in the form of at least one first SIM Application Toolkit dialogue, characterised in that said radiocommunication module also cooperates with an equipment, called a third item of equipment due to the third item of equipment being separated from a first item of equipment which is said SIM card and from a second item of equipment which is said module, and in that said radiocommunication module comprises means to convert said at least one first dialogue, between said SIM card and said module, into at least one second dialogue, between said module and said third item of equipment, such that said SIM card controls said third item of equipment via said module, and wherein:

said at least one first SIM Application Toolkit type dialogue is constructed with at least part of a set of SAT commands written according to a first encoding, and said at least one second dialogue is constructed with at least part of a set of commands and/or unsolicited results written according to a second encoding separate from said first encoding; and said set of commands and/or unsolicited results comprises:

a configuration command (STSF), via which the third item of equipment informs the module of the SIM Application Toolkit type functions supported by said third item of equipment;

an SAT command indication (STIN), via which the module indicates to the third item of equipment which of said SAT commands it has received from the SIM card;

an information retrieval command (STGI), via which the third item of equipment requests the module to give it a module response containing information relating to one of said SAT commands mentioned in an SAT command indication previously received by the third item of equipment;

a response control indication (STCR), via which the module requests the third item of equipment to give it a user response relating to a connection that the module wishes to set up, said user response being intended to be provided to the SIM card by the module, such that the SIM card performs a prior check of said connection; and a user response provision command (STGR), via which the third item of equipment gives a user response to the module, after said third item of equipment has successively received an SAT command indication followed by a module response to a corresponding information retrieval command.

22. Radiocommunication module of the type cooperating with a SIM card in the form of at least one first SIM Application Toolkit dialogue, characterised in that said radiocommunication module also cooperates with an equipment, called a third item of equipment due to the third item of equipment being separated from a first item of equipment which is said SIM card and from a second item of equipment which is said module, and in that said radiocommunication module comprises means to convert said at least one first dialogue, between said SIM card and said module, into at least one second dialogue, between said module and said third item of equipment, such that said SIM card controls said third item of equipment via said module, and wherein:

said at least one first SIM Application Toolkit type dialogue is constructed with at least part of a set of SAT commands written according to a first encoding, and in that said at least one second dialogue is constructed with at least part of a set of commands and/or unsolicited results written according to a second encoding separate from said first encoding;

said second encoding belongs to the group comprising:
AT type encoding; and
level 2 encapsulation type encoding; and said set of commands and/or unsolicited results comprises:

a configuration command (STSF), via which the third item of equipment informs the module of the SIM Application Toolkit type functions supported by said third item of equipment;

an SAT command indication (STIN), via which the module indicates to the third item of equipment which of said SAT commands it has received from the SIM card;

an information retrieval command (STGI), via which the third item of equipment requests the module to give it a module response containing information relating to one of said SAT commands mentioned in an SAT command indication previously received by the third item of equipment;

a response control indication (STCR), via which the module requests the third item of equipment to give it a user response relating to a connection that the module wishes to set up, said user response being intended to be provided to the SIM card by the module, such that the SIM card performs a prior check of said connection; and a user response provision command (STGR), via which the third item of equipment gives a user response to the module, after said third item of equipment has successively received an SAT command indication followed by a module response to a corresponding information retrieval command.

* * * * *